United States Patent
Autenrieth et al.

(10) Patent No.: US 6,355,367 B1
(45) Date of Patent: Mar. 12, 2002

(54) PROCESS AND APPARATUS FOR APPLYING PRESSURE TO A REACTANT

(75) Inventors: Rainer Autenrieth, Erbach; Andreas Docter, Laupheim; Steffen Wieland, Wetzlar, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/513,452

(22) Filed: Mar. 3, 2000

(30) Foreign Application Priority Data

Mar. 3, 1999 (DE) .......................................... 199 09 145

(51) Int. Cl.$^7$ ................................................ H01M 8/04
(52) U.S. Cl. ......................................................... 429/17
(58) Field of Search ........................................... 429/17

(56) References Cited

U.S. PATENT DOCUMENTS

| | | | |
|---|---|---|---|
| 4,828,940 A | 5/1989 | Cohen et al. ................. | 429/20 |
| 4,973,528 A | * 11/1990 | Sanderson ................. | 429/17 X |
| 5,045,414 A | 9/1991 | Bushnell et al. .............. | 429/17 |
| 5,248,566 A | 9/1993 | Kumar et al. | |
| 6,110,613 A | * 8/2000 | Fuller .......................... | 429/17 |
| 6,117,577 A | * 9/2000 | Wilson ........................ | 429/17 |

FOREIGN PATENT DOCUMENTS

DE  44 25 634 C1   7/1994

\* cited by examiner

Primary Examiner—Gerald A. Michalsky
(74) Attorney, Agent, or Firm—Crowell & Moring LLP

(57) ABSTRACT

A method and apparatus for applying pressure to at least one reactant for delivery from a storage tank to a gas generating system has at least one pump. An operating medium for applying pressure to the reactants is delivered from the pump to the storage tank via a pipe system. The operating medium itself may also be delivered to a reaction chamber as a reactant of the gas generating system.

7 Claims, 1 Drawing Sheet

PROCESS AND APPARATUS FOR APPLYING PRESSURE TO A REACTANT

BACKGROUND AND SUMMARY OF THE INVENTION

This application claims the priority of German patent document 199 09 145.5, filed Mar. 3, 1999, the disclosure of which is expressly incorporated by reference herein.

The present invention relates to a process and apparatus for applying pressure to a reactant which is to be delivered from a storage tank to a reaction vessel.

For example, for the operation of fuel cells with proton-conducting electrolyte membranes (PEM fuel cells) for mobile applications, hydrogen is to be generated from a hydrocarbon by means of water vapor reforming and/or partial oxidation. Both processes require the delivery and metering of the reactants in liquid form. On the one hand, hydrocarbon and/or water must be metered into the evaporator. On the other hand, for providing process heat, the hydrocarbon must be metered in for the subsequent burning. In addition, process air must always be sufficiently available.

U.S. Pat. No. 5,248,566, for example, discloses a fuel cell with a reformer for a motor vehicle, in which water, air and a fuel (such as methanol), are supplied to the reformer by way of a delivery line. The delivery and the metering of the water and of the methanol normally takes place by metering pumps. However, in a complex fuel cell system, a large number of such metering pumps may be required.

German Patent Document DE 44 25 634 C1 provides an arrangement for metered feeding of liquid reactants from a storage tank to a fuel cell system by means of a delivery pump via a delivery line, in which a metering valve is arranged in the delivery line between the delivery pump and the fuel cell system. Upstream of the metering valve, a return line branches off the delivery line, and a differential pressure regulator is arranged in the return line, which adjusts the pressure difference between the delivery line and the fuel cell system to a defined value. The reactants to be delivered are each brought to the required pressure by separate pumps and are fed to the system directly or by way of valves.

In this apparatus, the pumps may be damaged or impaired by aggressive pumping media, such as methanol, or by contamination. Because of the required large number of pumps, including the related pump control, costs are considerable. On the other hand, when reasonably priced pumps are used, it is found that pressure surges occur when liquid media are delivered, which result in fluctuations of the metering output. Similar difficulties also occur in the case of common-rail systems for diesel combustion engines or common-rail high-purity water systems for fuel cell systems.

It is an object of the present invention to provide a pump system which is equally efficient as conventional pump systems, and can be implemented in a simpler and more reasonably priced manner.

Another object of the invention is to provide such a pump system which permits a precise and reliable metering of reactants.

These and other objects and advantages are achieved by an arrangement for admitting pressure to at least one reactant which is to be delivered from a storage tank, in which the at least one pump is prevented from coming into contact with the reactant (particularly aggressive media) to be delivered. According to the invention, pressure is transmitted to several reactants, which are stored in different storage tanks, by means of a single delivery pump for delivering an operating medium. Pressure generated by the delivery pump is applied to the respective storage tanks via the operating medium. As a result, the provision of individual pumps for each reactant to be delivered is not necessary, which reduces the costs of the pump system as a whole. If different pressure levels are required in the system, it is of course also possible that two or more such central pumps are used.

Expediently, a gaseous medium particularly air, is used as the operating medium. As a result, a significant reduction of pressure surges can be achieved when the reactants are delivered.

It is also found to be advantageous to control the flow rate of the reactants from their respective storage tanks by means of valves which can be operated in a pulsed manner. Such valves are available at reasonable cost and in practice are found to be robust and require little maintenance.

It is also possible to control the flow rate of the reactants from their respective storage tanks by means of continuously operable valves, particularly proportional valves, whose flow cross-section can be varied. As the result of this measure, a particularly uniform provision of the reactants can be achieved, for example, for a fuel cell.

Expediently, at least one pressure-maintaining valve is provided by means of which the pressure of the operating medium can be kept constant. As the result, it is possible to use a relatively low-cost delivery pump for delivering the operating medium and for building up pressure in the respective storage tanks.

According to another advantageous further development of the invention, the operating medium can at the same time be used as a reactant of the gas generating system. Particularly when air is used as the operating medium, this air can be fed, for example, to the CO-oxidation agent of a fuel cell system.

According to another advantageous embodiment, movable walls or pistons are constructed in the pipe system and/or the storage tanks, in order to avoid contact between the operating medium and the reactants to be delivered. In this manner, diffusion effects between the respective media can be avoided.

In addition, it is possible to provide at least one return valve in the pipe system, which also helps to prevent diffusion effects between the respective media.

According to another advantageous further development of the invention, an inert gas, such as nitrogen, is used as the operating medium. This measure is particularly advantageous if easily oxidizable liquids are to be delivered.

Other objects, advantages and novel features of the present invention will become apparent from the following detailed description of the invention when considered in conjunction with the accompanying drawings.

DETAILED DESCRIPTION OF THE DRAWINGS

Figure 1:
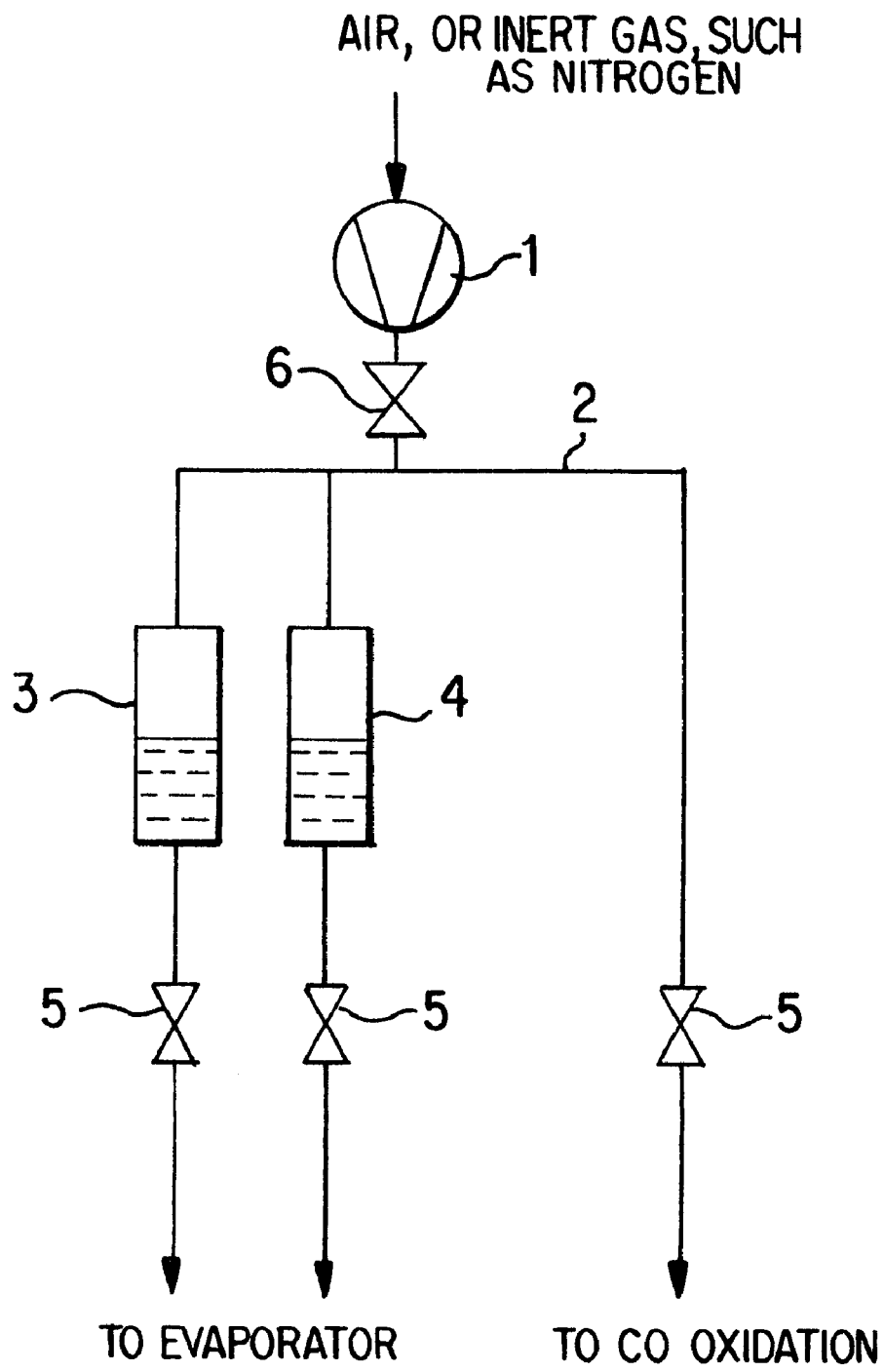
FIG. 1 is a schematic representation of a preferred embodiment of the arrangement of the invention for admitting pressure to reactants of a fuel cell system.

The system illustrated in FIG. 1 has a central pump 1 by means of which pressure can be transmitted to a pipe system 2, which communicates with storage tanks 3, 4 as well as with at least one metering valve 5. In the illustrated case of the reactant supply to a fuel cell system, for example, a fuel such as methanol is stored in storage tank 3, and water is storage tank 4. As a result of the pressure generated by the delivery pump 1 and delivered to the storage tanks 3, 4 via the pipe system 2, the media inside the storage tanks 3, 4 are also pressurized. By way of respective metering valves 5, the media can then be fed to the evaporator of the fuel cell system (not shown). Pressure of the pressure medium in the pipe system and the storage tanks is kept constant by at least one pressure maintaining valve 6.

The pressurized air inside the pipe system 2 used as the operating medium can also be used as process air for use by a (not shown) CO oxidation agent of the fuel cell system, for example. It is found to be expedient to provide the process air to the CO oxidation agent by means of another metering valve 5.

It should finally be noted that the illustrated system can also be used for common rail systems, for example, for diesel combustion engines or high-purity water systems in fuel cell systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for applying pressure to at least one reactant which is to be delivered continuously to a gas generating system in a fuel cell system from at least one storage tank, comprising:

applying pressure to an operating medium via at least one delivery pump; and delivering pressurized operating medium from said pump to said storage tank, to transmit pressure in said operating medium to said at least one reactant in said at least one storage tank via a pipe system.

2. The process according to claim 1, wherein by means of the delivery pump, a plurality of reactants stored in different storage tanks, are pressurized by the delivery of the operating medium via the pipe system.

3. The process according to claim 1 wherein, one of air and another gaseous medium is used as the operating medium.

4. The process according to claim 3, wherein said gaseous medium is one of nitrogen and another inert gas.

5. The process according to claim 1, wherein the delivery of the reactants from the storage tanks is controlled by means of valves operated in one of a pulsed manner, and a continuous manner by means of a variable cross-section.

6. The process according to claim 1, wherein the pressure of the pressure medium in the pipe system and the storage tanks is kept constant by means of at least one pressure maintaining valve.

7. The process according to claim 1, wherein the operating medium is simultaneously used as the reactant of the gas generating system.

* * * * *